Dec. 4, 1934.    L. N. HAMPTON ET AL    1,982,805
PNEUMATIC TICKET DISTRIBUTING SYSTEM
Filed June 1, 1933    6 Sheets-Sheet 2

INVENTORS: L.N. HAMPTON
R.W. DAVIS
C.D. RICHARD
BY J. MacDonald
ATTORNEY

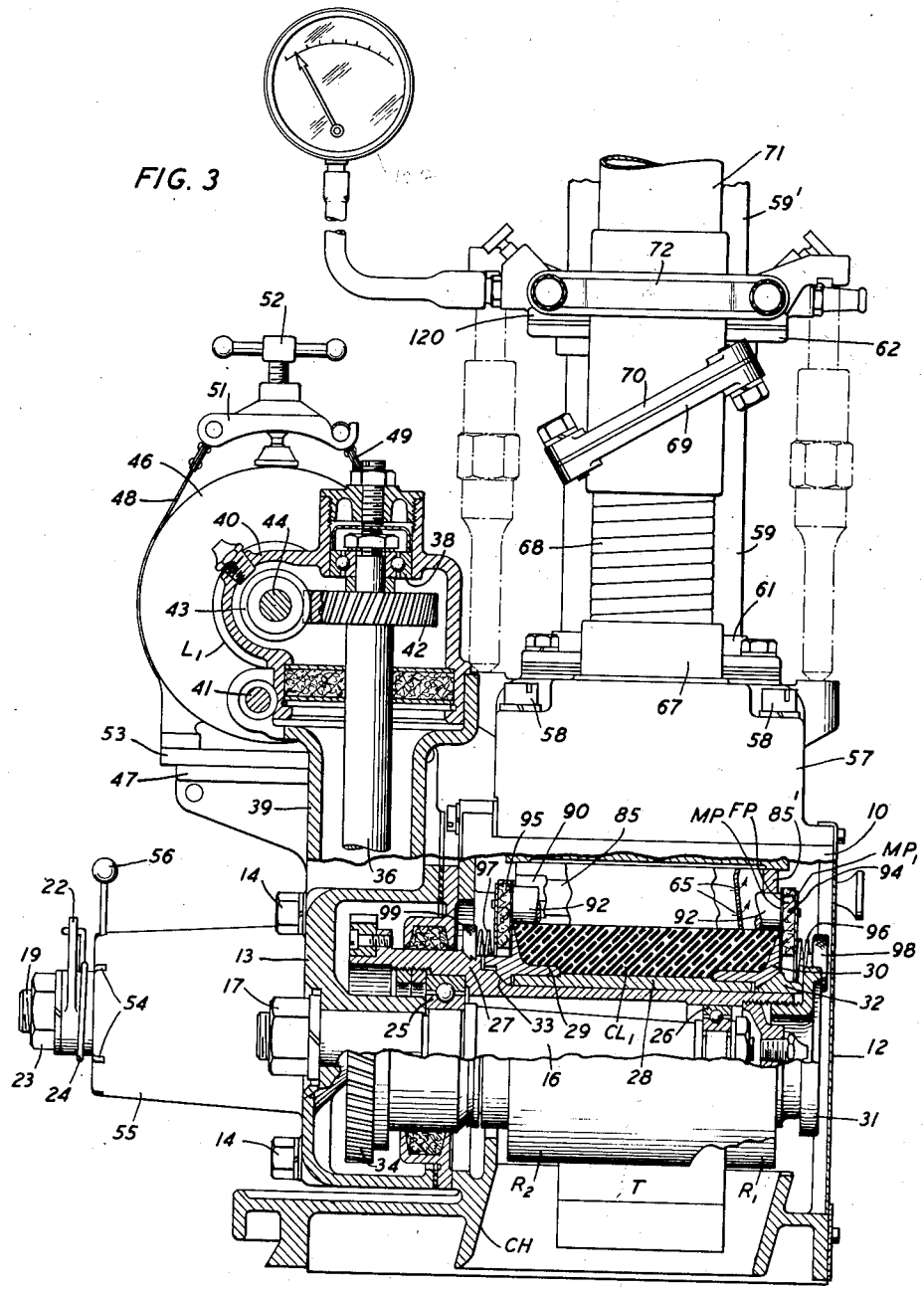

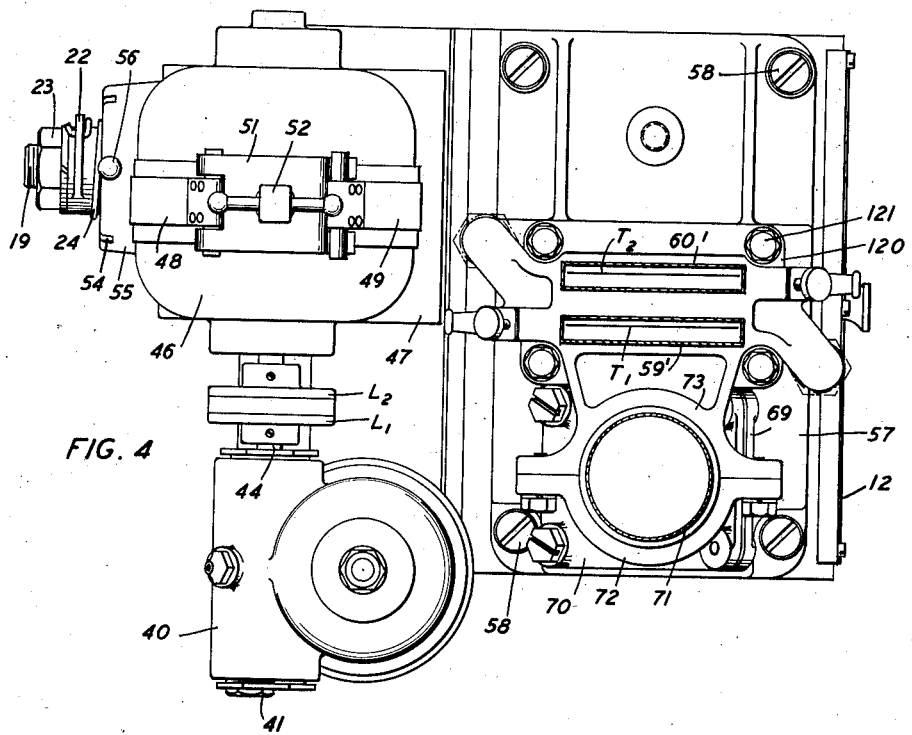
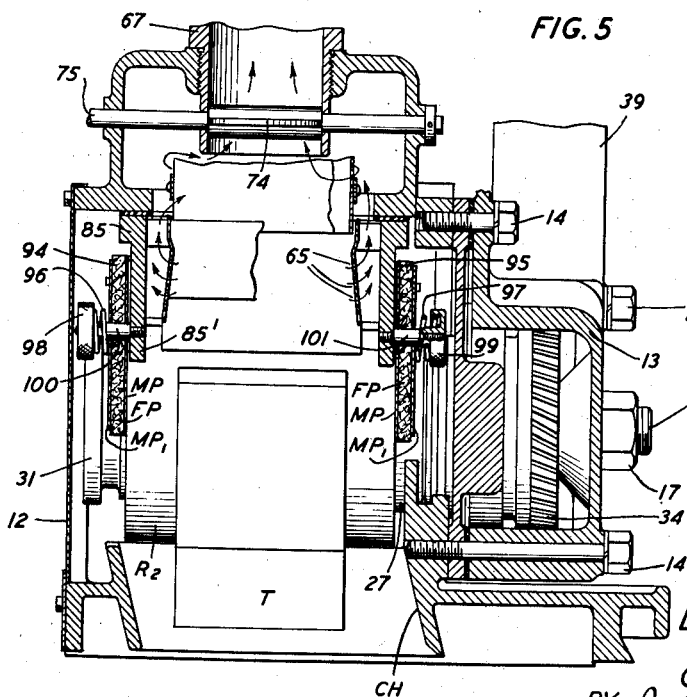

Dec. 4, 1934.   L. N. HAMPTON ET AL   1,982,805
PNEUMATIC TICKET DISTRIBUTING SYSTEM
Filed June 1, 1933   6 Sheets-Sheet 5
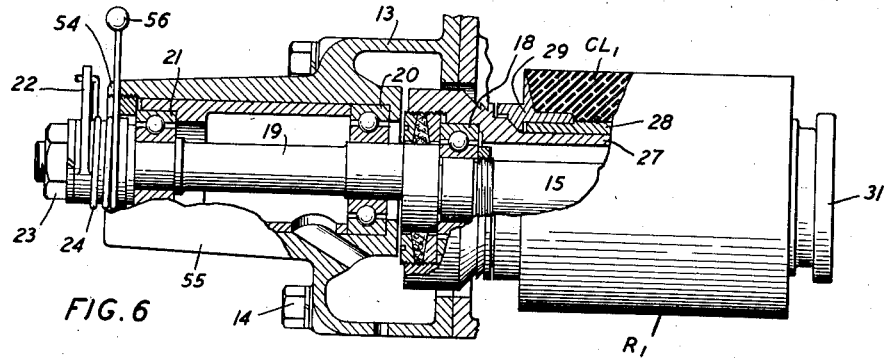
FIG. 6
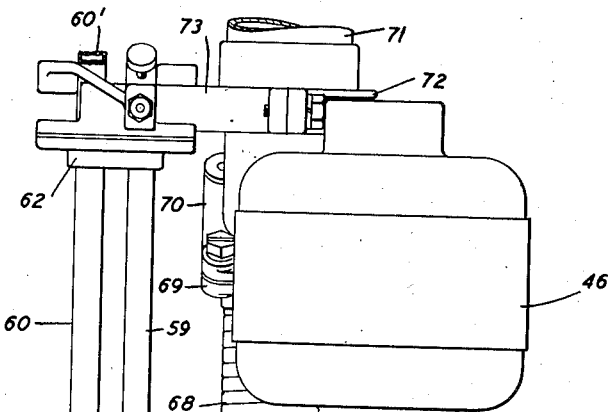
FIG. 7
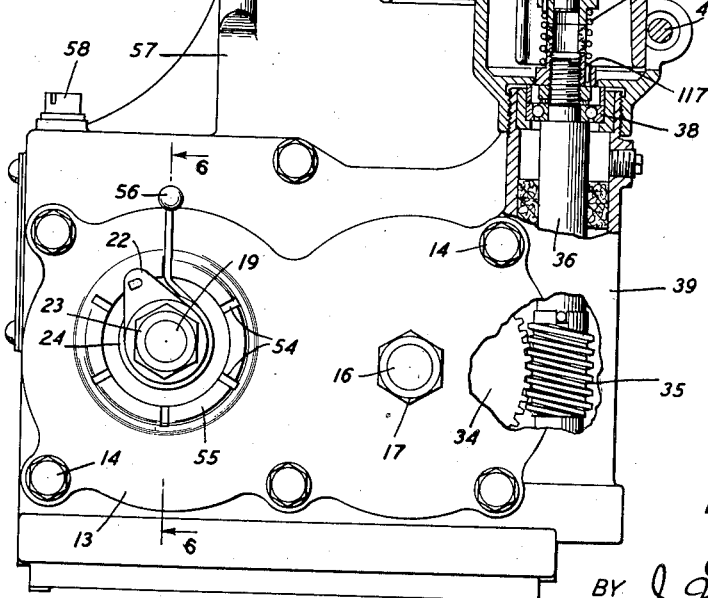
INVENTORS:
L. N. HAMPTON
R. W. DAVIS
C. D. RICHARD
BY J. MacDonald
ATTORNEY

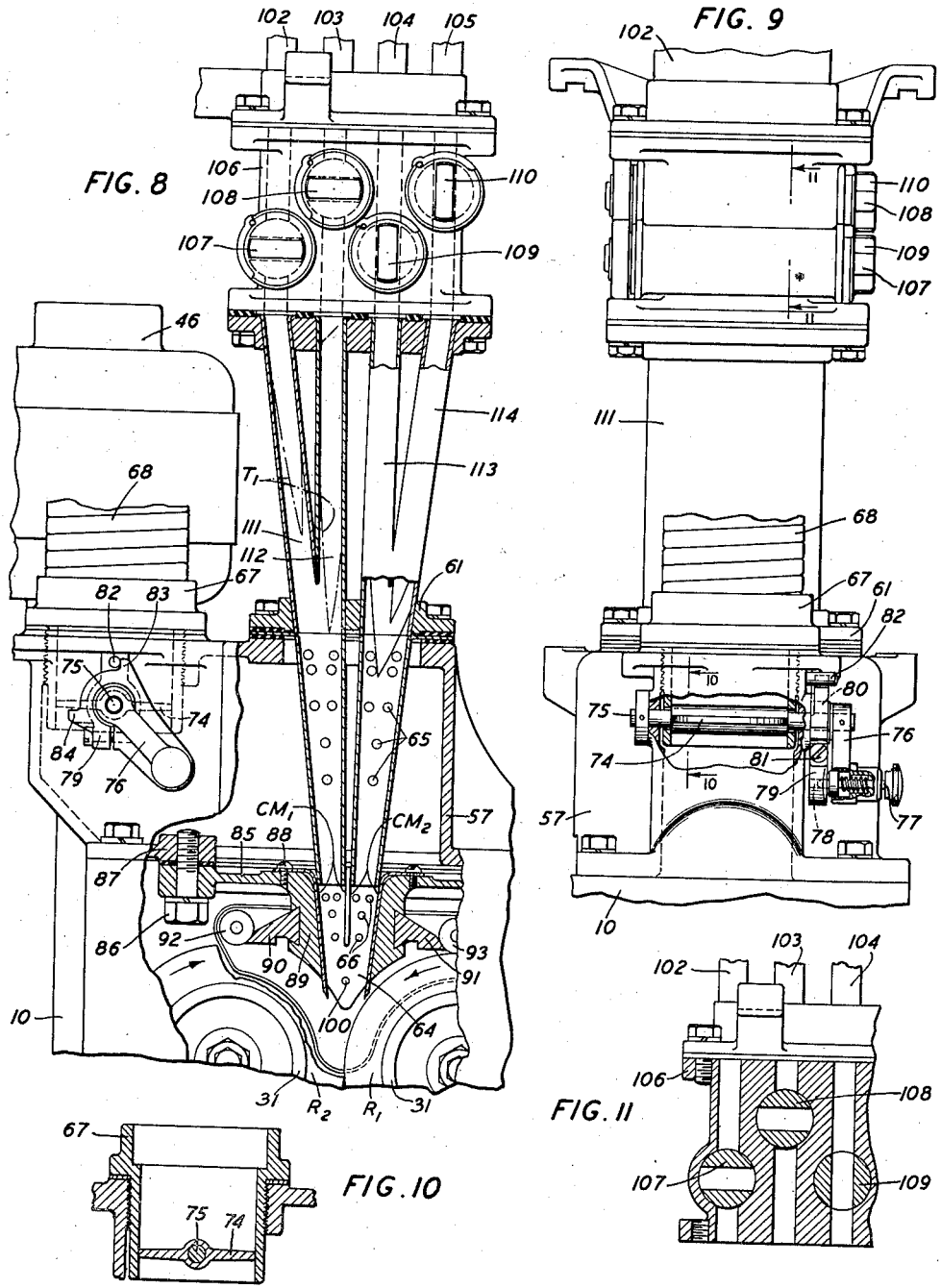

Patented Dec. 4, 1934

1,982,805

UNITED STATES PATENT OFFICE 1,982,805

PNEUMATIC TICKET DISTRIBUTING SYSTEM

Leon N. Hampton and Roy W. Davis, New York, and Charles D. Richard, West New Brighton, N. Y., assignors to Bell Telephone Laboratories, Incorporated, New York, N. Y., a corporation of New York Application June 1, 1933, Serial No. 673,884

7 Claims. (Cl. 302—2)

This invention relates to pneumatic ticket distributing systems and more specifically to a type of rotary receiving valve used in such systems.

Applicants discovered that in such systems it frequently happens that a large number of tickets pass between the rollers at the same instant and are therefore subjected to high pressure which was one of the causes of many tickets being destroyed. Applicants further discovered that tickets were also destroyed due to the fact that in prior valves the two rollers are positively connected to each other by a common gear mechanism and that it was impractical or impossible to machine and maintain the two rollers with equal diameter and consequently equal surface speed, which resulted in the undue wearing of these rollers, the rapid wearing of the gear mechanism, the unnecessary constant loading of the motor and the destroying of tickets due to the differential actions of the rollers on the tickets and the high pressure to which these tickets are subjected at that instant.

The object of this invention is to improve the construction and operation of such a valve.

According to this invention the tickets are propelled by air currents in a plurality of ticket sending tubes of rectangular cross-section terminating in a casing which thus forms a ticket receiving chamber and a housing for a pair of rotating cylinders or rollers between which the tickets are delivered mechanically into a chute provided at the lower end of the casing. Spindles supported by the casing are provided for mounting the rollers and one of these spindles forms with a shaft an eccentric to provide means for permitting the axial displacement of one of these rollers upon the passing of one or a plurality of tickets between the rollers. Adjustable means is provided for imparting a rotary movement to the eccentric spindle for yieldably holding the rollers in frictional engagement with each other and for securing the proper pressure contact between these rollers in order to avoid the damaging of the tickets upon their passing between the rollers. Means formed with the housing is provided for mounting a motor for actuating the rollers through the operation of a gearing mechanism with detachable means for securing the motor on the housing while permitting to easily and quickly disconnect the motor from its support for inspection and repairs. Means is provided in the housing for mounting a tube section which serves for attaching the receiving ends of the ticket guiding tubes each converging toward the engaged point of the rollers for guiding the tickets therebetween. Means is provided in the tube section for closing the ticket guiding tubes independently of each other during the probing for tickets, with adjustable means in the exhaust tubing adjacent the ticket housing for controlling the current of air in the ticket guiding tubes in order to control the speed of the tickets in these tubes in relation to the surface speed of the rollers, such means being operable for generating air impulses in the ticket guiding tube to assure the arrival of the ticket in the valve receiving chamber.

Other features and advantages of the invention will appear from the following description and by the claims appended thereto, reference being had to the following drawings in which:

Fig. 3 is a side elevation showing the casing and a number of operating parts in section;

Fig. 4 is a top assembly view;

Fig. 5 is a central sectional view taken on line 5—5 of Fig. 1;

Fig. 6 is a partial view of the casing showing a number of operating parts in section;

Fig. 7 is a modification of the roller driving mechanism shown in Fig. 1;

Fig. 8 is a partial view of the casing in section showing a modification of the ticket sending tube shown in Fig. 1;

Fig. 9 is a side view thereof showing the air current controlling mechanism in the exhaust tubing;

Fig. 10 is a detail view of the valve used in connection with such mechanism; and Fig. 11 is a partial sectional view of the modified ticket tube section and associated valves.

Figure 1:
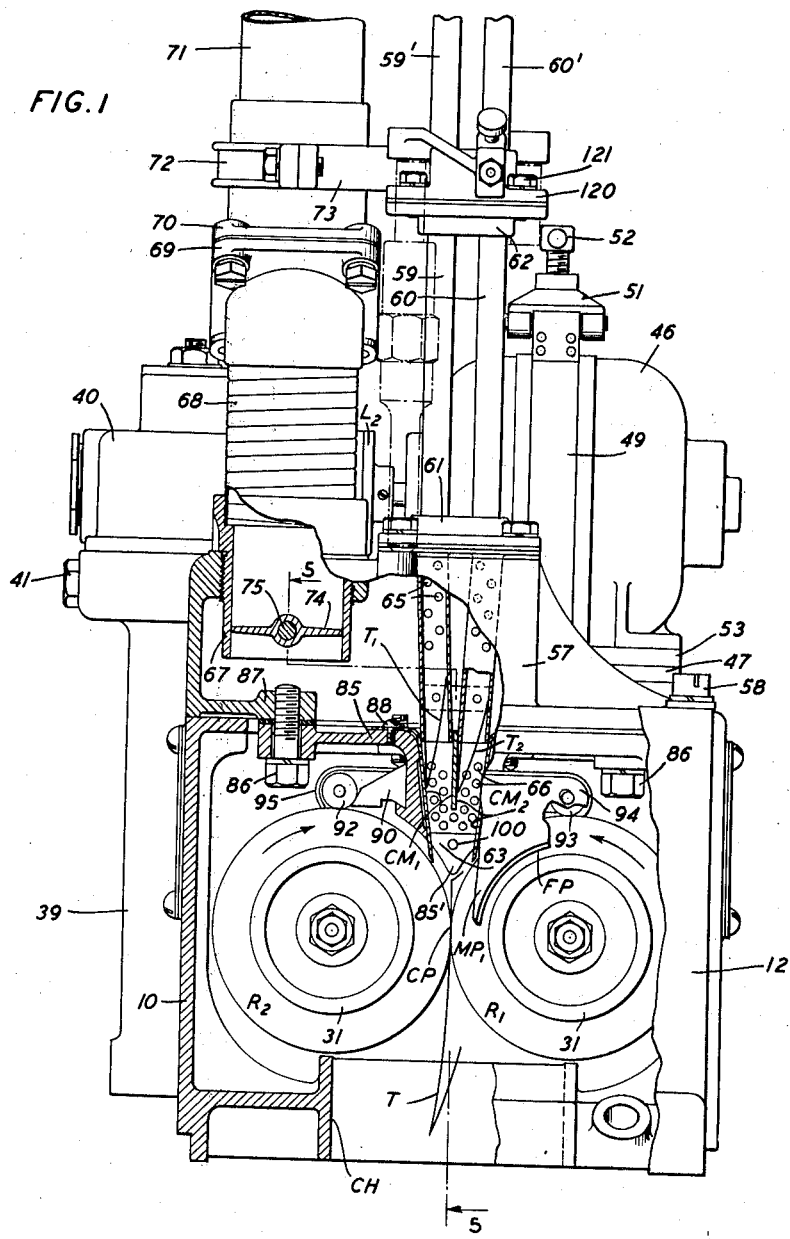
Fig. 1 is a front elevation of the device showing portions of the casing in section.
Figure 2:
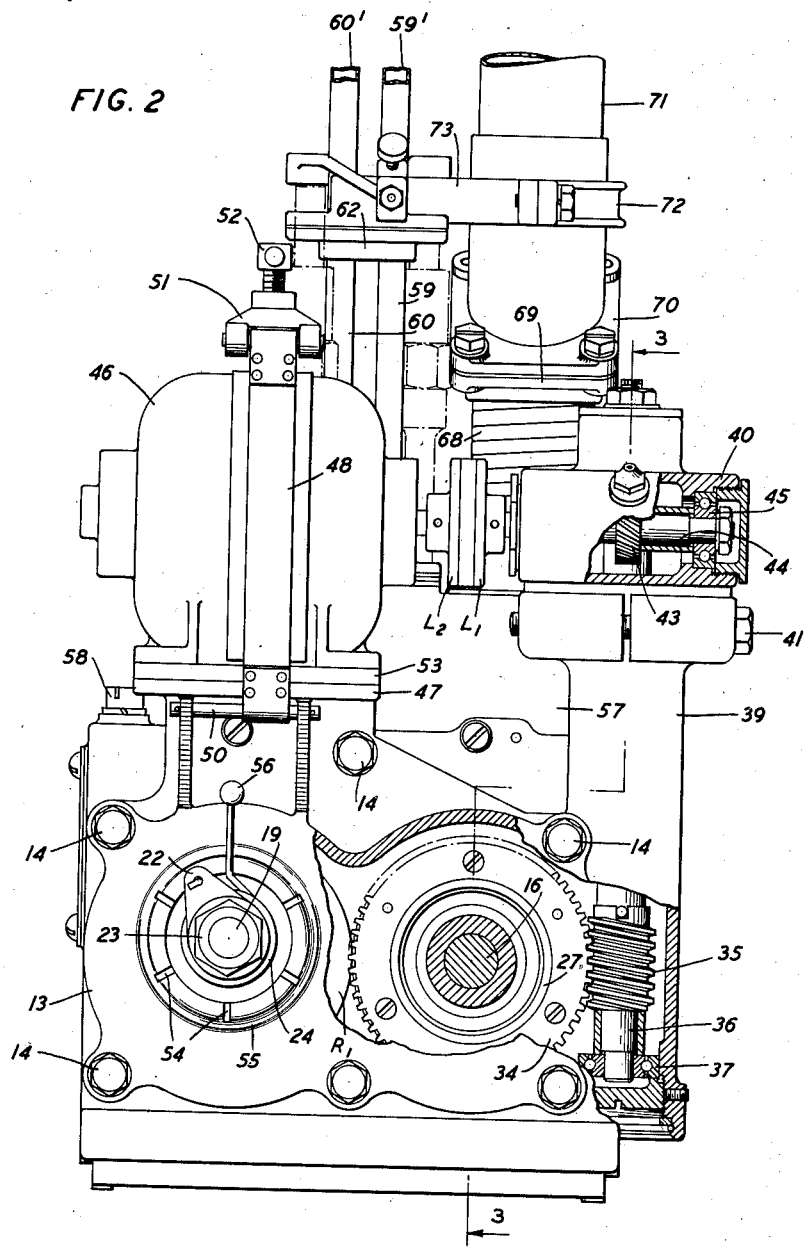
Fig. 2 is a rear elevation thereof.

In Figs. 1, 2 and 3 of the drawings 10 is a casing combined as to form a ticket receiving chamber and for housing a pair of parallelly disposed rollers R1 and R2, this casing being provided with an open side adjacent the front ends of the rollers which is covered by a sheet 12 of transparent material and an opening or chute CH at its lower end for the delivery of the tickets in a manner which will be hereinafter described in detail.

In Figs. 2, 3, 5 and 7, 13 indicates a casing portion which is mounted on the main casing 10 and secured thereon by a number of screws such as 14. On this casing portion is mounted a spindle 16 which is securely held thereon at one end by a nut 17 and on this spindle is mounted as on ball bearings 25 and 26 a driving roller R2. On casing portion 13 and in parallel relation to spindle 16 there is journaled as on ball bearings 20 and 21 a shaft 19 best seen in Fig. 6 having an eccentric spindle 15 integrally formed therewith for mounting an idler roller R1. Each of these rollers consists of a hub member 27 having a cylindrical portion for receiving a sleeve 28 provided at each end with similarly shaped flange pieces 29 and 30 having cone surfaces and a rubber cylinder CL1 preferably vulcanized on the sleeve 28 with the flange pieces 29 and 30 to form therewith a homogeneous assembly, the sleeve 28 being held securely on the hub 27 by a thumb screw or knob 31 threadedly engaging the front end of hub 27 for forcing a cone member 32 in abutment against the cone surface of flange piece 30 and thereby the engagement of the cone surface of flange piece 29 with cone surface 33 formed on the hub 27 best seen in Fig. 3.

On the other end of hub 27 which supports roller R2 there is mounted a gear 34 which is engaged by a worm screw 35 shown in Figs. 2 and 7 carried by a vertically disposed shaft 36, this shaft being journaled at its lower end in a ball bearing 37 mounted in a vertical projection 39 formed with casing portion 13 and its other end in a bearing 38 in a casing portion 40 in turn clamped at the upper end of projection 39 under the action of a screw 41 as shown in Figs. 2 and 3.

On the upper end of shaft 36 is mounted a helical gear 42 which engages with a helical gear 43 carried by a shaft 44 journaled at both ends in roller bearings 45, one of them being shown in Fig. 2 and one end of shaft 44 extends outwardly from casing portion 40 and carries the element L1 of a coupling device, the element L2 of which is secured to one end of the armature shaft of a motor 46 provided for rotating the roller R2 as will be hereinafter described in detail.

Motor 46 is mounted on a base 47 shown in Figs. 1, 2, 3 and 4 formed integrally with the casing portion 13 and is held securely thereon by a clamping device in the form of two metallic strips 48 and 49 which are hooked to the casing 10 and casing portion 13 by pins 50 and their other ends connected by a link member 51 which carries a screw 52 abutting against the motor 46 for tensioning the strips 48 and 49 and thereby holding the motor firmly in place on the base 47, a pad 53 of yieldable material being interposed between the motor and the base 47 for damping the vibrations of the motor.

As shown in Figs. 1, 3, 4, 6 and 7 the idler roller R1 which is mounted on crank pin or spindle 15 is yieldably held against driving roller R2 by a spring 24 having one of its ends hooked to the free end of a lever member 22. This lever is mounted on the outwardly projecting end of crank shaft 19 and is secured thereon by a nut 23. The other end of spring 24 extends in a radial direction and carries a knob 56 for moving this end of the spring in engagement with any one of a plurality of radially disposed slots 54 at the end of casing projection 55 for tensioning the spring 24. The tension of spring 24 tends to rotate the crank shaft 19 and the spindle 15 carried thereby for urging with the paper contact pressure the idle roller R1 in frictional engagement with roller R2 while permitting the axial displacement of roller R1 toward and away from roller R2 upon the passing of a plurality of tickets between these rollers at the same instant.

As shown in Figs. 1, 2, 3, 4 and 7 on casing 10 there is mounted a casing portion 57 held securely thereon by a number of screws 58 and on this casing portion is mounted a pair of short tubings 59 and 60 of rectangular cross-section held in spaced relation at both ends by spacer members 61 and 62. The lower ends of tubings 59 and 60 of the ticket tubing section thus formed extend into the casing portion 57 in engaged relation with similarly shaped guiding members CM1 and CM2, best seen in Figs. 1 and 8 secured on a plate 85 by a number of screws 88, and converge at their lower ends toward the contacting point of rollers R1 and R2 for guiding the tickets T1 and T2, etc. therebetween to be delivered by the operation of the rollers through the chute CH of casing 10. To the spacer member 62 is connected a casting 120 by a number of screws 121 shown in Fig. 1 and to this casting are attached the ends of the ticket sending tubes 59' and 60', which extend as is well known to ticket sending valves, not shown, placed at certain operators' positions. A gauge of the Bourdon type, for example, supported by the casting 120 as shown in Fig. 3 is provided for indicating the air pressure in the ticket sending tubes and the exhaust tube, the casting 120 being formed with the element 73 of a clamping device, such element cooperating with its companion element 72 for holding an exhaust tubing 71 in spaced relation therewith.

The lower ends of tubing sections 59 and 60 as well as members GM1 and GM2 are provided at their sides with a plurality of apertures 65 and 66 to form an air path toward the lower end of a bushing 67 best seen in Figs. 1, 5, 8, 9 and 10, apertures 65 and 66 being provided to decrease the air propelling effect at this point and thereby the speed of the tickets prior to their engagement with the rollers R1 and R2 thus preventing their deformation which would otherwise occur if permitted to engage these rollers at a too high velocity with respect to the surface speed of the latter.

Bushing 67 threadedly engages the casing portion 57 and has a counterbore for receiving the end of a flexible tubing section 68 having obliquely disposed attaching flange 69 for connecting this tube section with a flange 70 of the air exhaust tube 71 to the other end of which an ordinary air pump, not shown, is connected for generating a continuous current of air in the ticket sending tubes 59 and 60 and the exhaust tubing 71, and two jack screws resting on the casing portion 57 are provided for supporting the ends of the ticket sending tubes and exhaust tube upon the removal of the exhaust tube section and the ticket tube section, the obliquity of the flanges 69 and 70 greatly facilitating the removal of this tube section from the casing portion 57.

In bushing 67 as shown in Figs. 1, 8, 9 and 10, there is mounted a valve in the form of a disc 74 carried by a shaft 75 extending from opposite sides of casing portion 57 for mounting a lever arm 76 for manually operating the valve. This lever arm is provided with a spring pressed pin 77 for engaging a depression in an adjustable arm 79 for locking the lever arm 76 and the valve 74 in adjusted position. The adjustable arm 79 is mounted on a bearing portion 80 formed with the casing portion 57 and is held securely in adjusted position thereon by a clamping screw 81, and a pin 82 on casing portion 57 cooperates with the abutting lugs 83 and 84 of arm 79 to permit the movement of the valve 74 from its full closed position to any point toward its full open position irrespective of the adjustment of arm 79, this independent movement of valve 74 generating air impulses in the ticket sending tubes for a purpose that will be hereinafter described in detail.

As shown in Figs. 1 and 8 the plate 85 which supports the guiding members GM1 and GM2 is securely held in adjusted position in casing 10 by a number of screws 86 threadedly engaging inwardly extending reenforced rim 87 formed with the casing portion 57. This plate has downwardly extending flange portions 85, forming a rectangularly tapered opening engaged by the ticket guiding members GM1 and GM2 as above described and on these downward extending flange portions are mounted in opposite sides two oblong-shaped bars 90 and 91 which serve as abutment for two relatively small rollers 92 and 93, respectively. These rollers have reduced end portions loosely engaging bearing portions in side plates 94 and 95, shown in Figs. 3 and 5, each consisting of two outer disposed thin metallic plates MP and MP1 and a felt pad FP.

The plate assemblies 94 and 95 are yieldably held against the ends of the rollers R1 and R2 by coiled springs 96 and 97 tensioned respectively by thumb screws 98 and 99 threadedly engaging the flanges of plate 85. The bars 90 and 91, the rollers 92 and 93, the side plates 94 and 95 cooperate with rollers R1 and R2 to prevent any escape of air from their contact points, the path of air being as above specified through the series of holes 65 and 66 and the space between the sides of the ticket guiding members GM1 and GM2 and the adjacent walls of the downward extending portions of plate 85.

In the modification shown in Figs. 8 and 9, four ticket tubings 102, 103, 104 and 105 are used and these tubings are connected to a corresponding number of bifurcated guiding members 111, 112, 113 and 114 through a tubing section in the form of a casting 106. This tubing section is provided with valves 107, 108, 109 and 110 arranged to be moved from the open position shown by valves 109 and 110 in Figs. 8 and 11 to the closed position shown by valves 107 and 108 for independently closing either one of their associated ticket tubes 102, 103, 104 and 105 whenever required for the probing of tickets which may be stopped in one of the tubes, while keeping the other ticket tubes and the valve in operation.

In the modification of the motor mounting as shown in Figs. 7 and 8 the armature shaft of motor 46 is disposed vertically in coaxially alignment with shaft 36 and these shafts are operatively connected by a coiled spring 115 having one of its ends engaging a bushing 116 keyed to the armature shaft of the motor and the other end of this spring engages a bushing 117 secured on the end of vertical shaft 36, thus avoiding the use of gears 42 and 43 described in connection with the drive used in the valve shown in Figs. 1, 2 and 3.

In the operation of the valve of this invention as shown in Figs. 2, 3 and 7, the operation of the motor is effective to rotate the roller R2 mounted on spindle 16 through the gear 43 on shaft 44 in engagement with gear 42 on shaft 36, the worm 35 in engagement with gear 34 mounted on hub 27, the latter forming part of roller R2.

Roller R1 which is mounted on crank spindle 15 as above described yieldably engages roller R2 due to the tension of spring 24 tending to rotate the crank shaft 19. Under this condition a ticket inserted in any one of the tubings 59' and 60' at any one of the operator's sending stations will be propelled in this tubing due to suction at the extreme end of the exhaust tubing 71, such air path being through tubings 59 and 60 including the tubing section formed by tubings 59' and 60', the series of holes 65 and 66 at the ends of such tubing section, the casing portion 57, the valve 74 set to its proper adjusted position, the exhaust tubing section 68 and exhaust tubing 71. The tickets T, T', etc. either singly or collectively reaching the contacting point CP of the rollers R1 and R2 are distributed through the rotation of the latter in the direction indicated by the arrow in the chute CH in the bottom of the casing, the proper contact pressure of the rollers on the tickets under any condition being maintained by the spring 24, thus preventing the damage of tickets, rollers and their operating mechanism.

In the operation of this valve whenever one or a plurality of tickets are stopped in one of the sending tubes 59' and 60', shown in Fig. 2, or 102, 103, 104 and 105 shown in the modification in Fig. 8, the lever 76 is unlatched from the adjustable arm 79 and manually operated an angular distance of substantially 90° for completely opening or closing the exhaust tube 68 in rapid succession and thereby causing air impulses in the ticket sending tubes, this operation being continued until the tickets reach the roller R1 and R2 to be mechanically delivered through the chutes CH at the lower end of the roller casing.

What is claimed is:

1. In a pneumatic ticket receiving valve, a driven roller, a motor operatively connected to said roller, an idle roller disposed adjacent and in parallel relation with said driven roller, an eccentric for supporting said idle roller, means tending to rotate said eccentric for yieldably holding said idle roller in frictional engagement with said driven roller, and means adjustable for controlling the effect of the first mentioned means on said eccentric.

2. In a pneumatic ticket receiving valve, a casing, a roller mounted in said casing, a motor, a gear mechanism operatively connecting said motor to said roller, a shaft journaled in said casing, a spindle carried by said shaft in eccentric relation therewith, an idle roller mounted on said spindle, and means tending to impart a turning movement to said shaft for frictionally engaging said idle roller with the first mentioned roller.

3. In a pneumatic ticket receiving valve, a casing, a spindle fixedly supported at one end in said casing, a roller mounted on said spindle, a crank shaft journaled in said casing having a spindle, a roller mounted free on said spindle adjacent and in parallel relation to the first mentioned roller, a motor, a gearing mechanism operatively connecting the first mentioned roller with said motor and a spring acting on said crank shaft for frictionally and yieldably engaging the roller on the spindle of said crank shaft with the roller on the first mentioned spindle.

4. In a pneumatic ticket receiving valve, a casing, a spindle secured on one end of said casing, a crank shaft mounted free on said casing and having a spindle eccentrically formed at one end thereof, a roller mounted on each of said spindles, spring means acting on said crank shaft for yieldably holding the roller on the spindle of said crank shaft in frictional engagement with the roller on said fixed spindle, adjustable means for controlling the action of said spring means, a motor and a gearing mechanism for operatively connecting one of said rollers with said motor.

5. In a pneumatic ticket receiving valve, a casing, a pair of rollers mounted in said casing in frictional engaged relation to each other, a ticket tube guiding section mounted on said casing having one end disposed adjacent the engaged point of said rollers for guiding the ticket therebetween, a chute for the ticket in said casing opposite said tube section, a motor mounted on said casing, means for operatively connecting one of said rollers to said motor and an eccentric supporting the other roller and movable for permitting the movement of this roller away from the geared roller upon the passing of a ticket therebetween.

6. In a pneumatic ticket receiving valve, a casing, a pair of rollers for driving the ticket from said casing, a plurality of ticket tubes having converging ends extending into said casing toward the engaged point of said rollers, an air exhaust tube having one end secured to said casing, said ticket tubes having at their ends a series of holes forming an air path toward said exhaust tube, a pair of plates, one at each end of said rollers, a pair of auxiliary rollers journaled on said plates and frictionally engaging the first mentioned rollers, a pair of bars mounted in said casing and serving as abutment for said auxiliary rollers, said bars, said auxiliary rollers and said plates cooperating with the first mentioned rollers and the series of holes at the ends of said ticket tubes to form a length portion of the air path toward said exhaust tubing, a motor, a gearing mechanism connecting one of said rollers to said motor, an eccentric for supporting the other roller and resilient means tending to rotate said eccentric for frictionally engaging said rollers, said means being adjustable for controlling the contact pressure of said rollers on the ticket.

7. In a pneumatic ticket receiving valve, a casing forming a ticket receiving chamber, a pair of frictionally engaged rollers mounted in said housing, a motor for actuating said rollers for driving the ticket from said casing a plurality of ticket guiding tubes terminating in said casing having their ends converging toward the engaged point of said rollers, an exhaust tubing having one end secured to said casing, said ticket guiding tubes having series of perforations on two opposite sides to form an air path leading to said exhaust tubing, a valve, means for adjusting said valve for controlling the air flow in said exhaust tubing, a plunger member engaging said casing for holding said valve in said adjusted position and permitting the operating of said valve independently of said adjusting means upon its release from said casing and manually operable valves for independently stopping the air flow in each of said ticket guiding tubes.

LEON N. HAMPTON.
ROY W. DAVIS.
CHARLES D. RICHARD.